United States Patent
Noe et al.

(10) Patent No.: US 12,302,891 B1
(45) Date of Patent: May 20, 2025

(54) SPINNING WING DECOY TECHNOLOGY

(71) Applicant: Expedite International, Inc., Baldwin, WI (US)

(72) Inventors: Tim Noe, Baldwin, WI (US); Bret Ayers, Baldwin, WI (US)

(73) Assignee: Expedite International, Baldwin, WI (US)

( * ) Notice: Subject to any disclaimer, the term of this patent is extended or adjusted under 35 U.S.C. 154(b) by 381 days.

(21) Appl. No.: 17/447,862

(22) Filed: Sep. 16, 2021

Related U.S. Application Data

(60) Provisional application No. 63/079,192, filed on Sep. 16, 2020.

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
USPC ........................................................ 43/2, 3
See application file for complete search history.

(56) References Cited

U.S. PATENT DOCUMENTS

| | | | | |
|---|---|---|---|---|
| 2,229,175 A * | 1/1941 | Johnson | ................ | A63H 23/10 43/3 |
| 5,884,427 A * | 3/1999 | Lenz | ..................... | A01M 31/06 43/2 |
| 5,930,936 A * | 8/1999 | Parr | ...................... | A01M 31/06 43/3 |
| 6,092,323 A * | 7/2000 | McBride | ............... | A01M 31/06 43/3 |
| 6,170,188 B1 * | 1/2001 | Mathews | .............. | A01M 31/06 43/3 |
| 6,212,816 B1 * | 4/2001 | Babbitt | ................. | A01M 31/06 43/3 |
| 6,339,894 B1 * | 1/2002 | Solomon | ............... | A01M 31/06 43/3 |
| 6,493,980 B1 * | 12/2002 | Richardson | ........... | A01M 31/06 43/3 |
| 6,508,028 B1 * | 1/2003 | Crowe | .................. | A01M 31/06 43/3 |
| 6,675,522 B2 * | 1/2004 | Mathews | .............. | A01M 31/06 43/3 |
| 7,671,749 B2 * | 3/2010 | Alvarado | .............. | A01M 29/06 340/573.2 |

(Continued)

FOREIGN PATENT DOCUMENTS

| | | | |
|---|---|---|---|
| CN | 214677351 U | * | 11/2021 |
| CN | 217284591 U | * | 8/2022 |
| EP | 1179296 A2 | * | 2/2002 ............ A01M 29/06 |

*Primary Examiner* — Darren W Ark
(74) *Attorney, Agent, or Firm* — Joel Skinner; Bryan Kravis

(57) ABSTRACT

A system, apparatus and method for controlling the stoppage of a spinning wing of a migratory bird decoy. When power is turned off by a remote controller, a photo eye sensor system identifies when a motor shaft needs to stop spinning so that the dark side of a wing stops facing upward. When the motor shaft is in a correct location, a wing shaft control cylinder is engaged, which locks the motor shaft/wing in the correct position with the dark side (feather) up. When engaged, a pin from the cylinder goes into a motor gear housing, which stops and holds the wing shaft, and therefore the wing, in the correct position.

3 Claims, 11 Drawing Sheets

(56) References Cited

U.S. PATENT DOCUMENTS

| | | | | |
|---|---|---|---|---|
| 7,814,857 | B2* | 10/2010 | Hally | A01M 29/16 116/22 A |
| 7,884,730 | B2* | 2/2011 | Alvarado | A01M 29/06 340/573.2 |
| 8,188,691 | B1* | 5/2012 | Twohig | A01M 31/06 43/2 |
| 9,538,744 | B1* | 1/2017 | Campbell | F16H 21/44 |
| 10,638,747 | B2* | 5/2020 | Noe | G06F 13/4077 |
| 11,246,307 | B2* | 2/2022 | Noe | A01M 31/06 |
| 11,344,024 | B2* | 5/2022 | Zink | A01M 31/06 |
| 2002/0069572 | A1* | 6/2002 | Price, Sr. | A01M 31/06 43/3 |
| 2003/0110676 | A1* | 6/2003 | Mathews | A01M 31/06 43/3 |
| 2005/0144828 | A1* | 7/2005 | Lewis | A01M 31/06 43/3 |
| 2009/0188148 | A1* | 7/2009 | Orris | A01M 31/06 43/2 |
| 2011/0023349 | A1* | 2/2011 | Hughes | A01M 31/06 43/2 |
| 2014/0033596 | A1* | 2/2014 | Schukow | A01M 29/06 43/2 |
| 2016/0309704 | A1* | 10/2016 | Young | A01M 31/06 |
| 2017/0042138 | A1* | 2/2017 | Oshgan | A01M 31/06 |
| 2019/0000069 | A1* | 1/2019 | Zink | A01M 31/06 |
| 2020/0008418 | A1* | 1/2020 | Peoples | A01M 31/06 |
| 2020/0077640 | A1* | 3/2020 | Jarboe | A01M 31/06 |
| 2025/0000081 | A1* | 1/2025 | Noe | A01M 31/06 |

* cited by examiner

SPINNING WING DECOY TECHNOLOGY

CROSS-REFERENCE TO RELATED APPLICATIONS, IF ANY

This application claims the benefit under 35 U.S.C. § 119(e) of U.S. Provisional Patent Application Ser. No. 63/079,192, filed Sep. 16, 2020, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to hunting decoy systems, apparatus and methods. Particularly, the invention relates to a spinning wing migratory bird (waterfowl, ducks, geese, doves, and the like) decoy. Most particularly, the invention relates to a system, apparatus and method for controlling the stoppage of spinning wings on a decoy to maximize the attraction of migratory birds to the decoy.

2. Background Information

Decoys have been used for many years to imitate an animal such as a bird for the purpose of attracting other birds to a particular location for hunting or other purposes. Modern migratory bird and waterfowl decoys come in many types, including floating, ground placed, and stake or base mounted. Decoy bodies may have fixed wings or movable wings. Movable wings may be spinning, flapping or the like. And movable wings may be actuated by motor power, by wind, or by other forces. Many waterfowl decoys are constructed of inexpensive plastic materials.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a wing control system, apparatus and method in or for a spinning wing migratory bird decoy apparatus, method, method of manufacture and method of use which are practical, reliable, accurate and efficient, and which are believed to fulfill a need and to constitute an improvement over the background technology.

In one aspect, the invention provides a system, apparatus and method for controlling the stoppage of a spinning wing of a migratory bird decoy. When power is turned off by a remote controller, a photo eye sensor system identifies when a motor shaft needs to stop spinning so that the dark side of a wing stops facing upward. When the motor shaft is in a correct location, a wing shaft control cylinder is engaged, which locks the motor shaft/wing in the correct position with the dark side (feather) up. When engaged, a pin from the cylinder goes into a motor gear housing, which stops and holds the wing shaft, and therefore the wing, in the correct position.

The aspects, features, advantages, benefits and objects of the invention will become clear to those skilled in the art by reference to the following description, claims and drawings.

DETAILED DESCRIPTION

Figure 1:
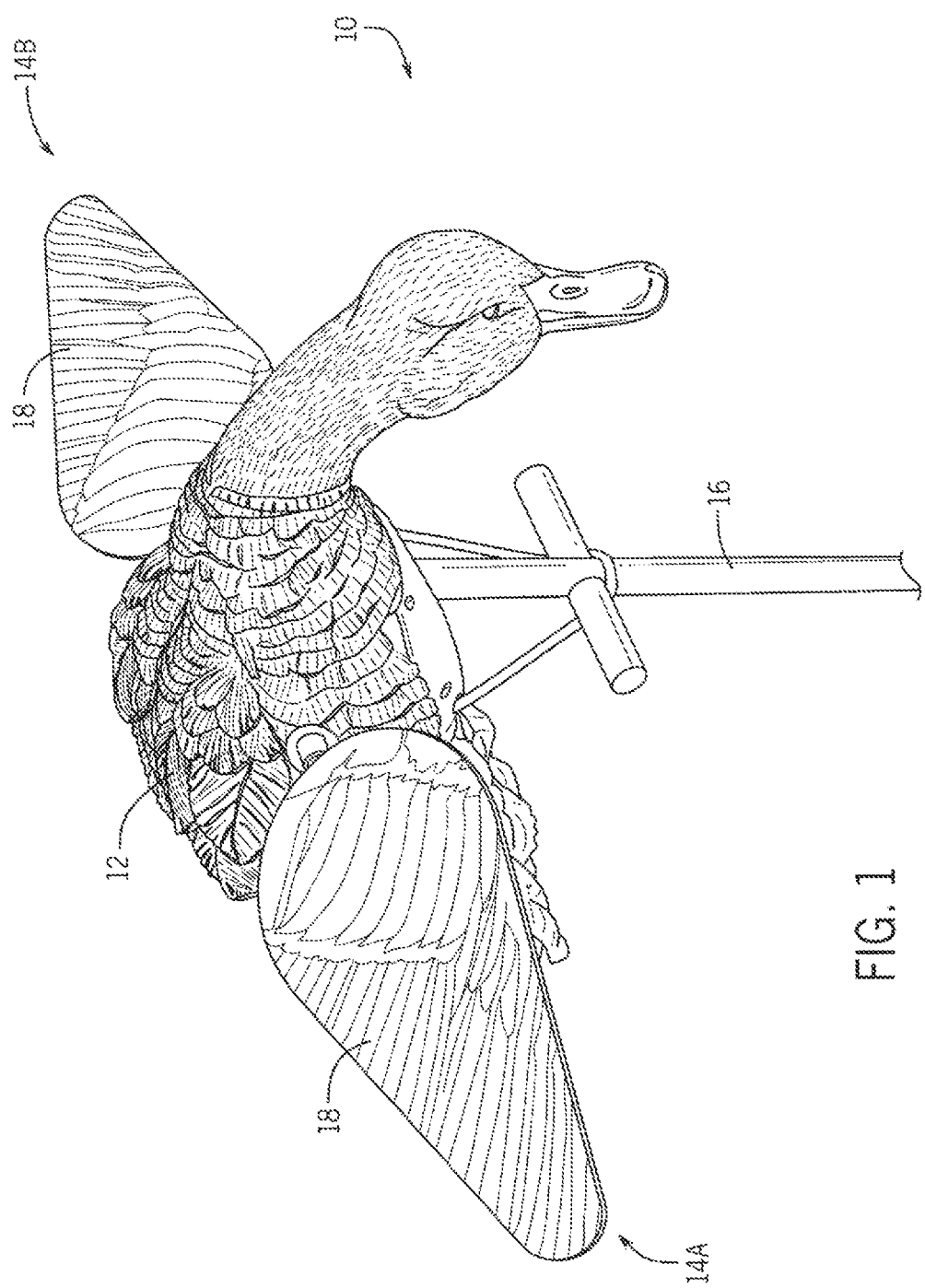
FIG. 1 is perspective view, from the top front, of a spinning wing migratory bird decoy, and showing one side of the wings with a dark surface look or color, typically including a feather pattern that mimics the top or outer side of waterfowl or other migratory bird wings.
Figure 2:
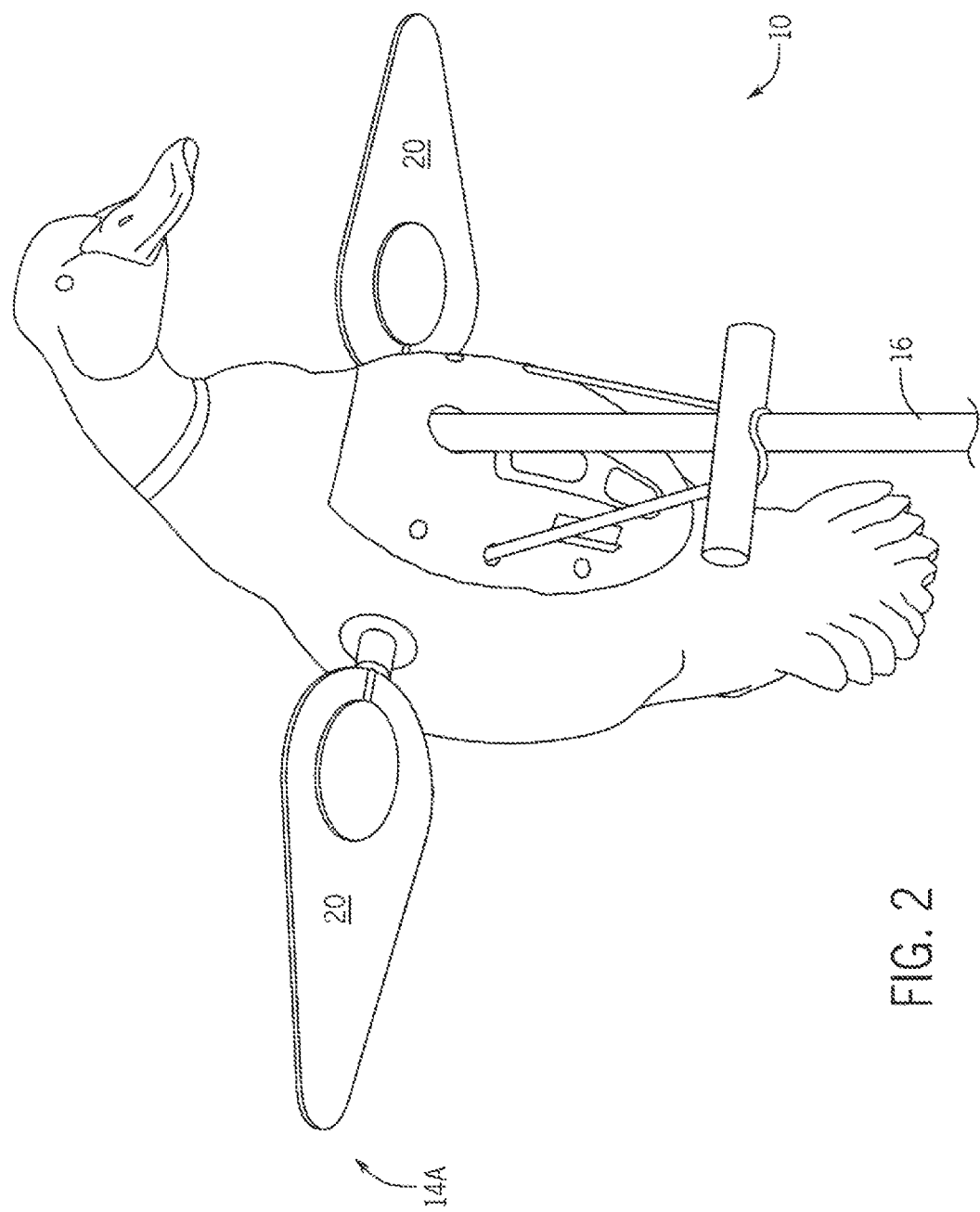
FIG. 2 is a perspective view, from the bottom front, of the decoy and showing the opposite side of the wings with a light look or color, typically white and devoid of a feather pattern.
Figure 3:
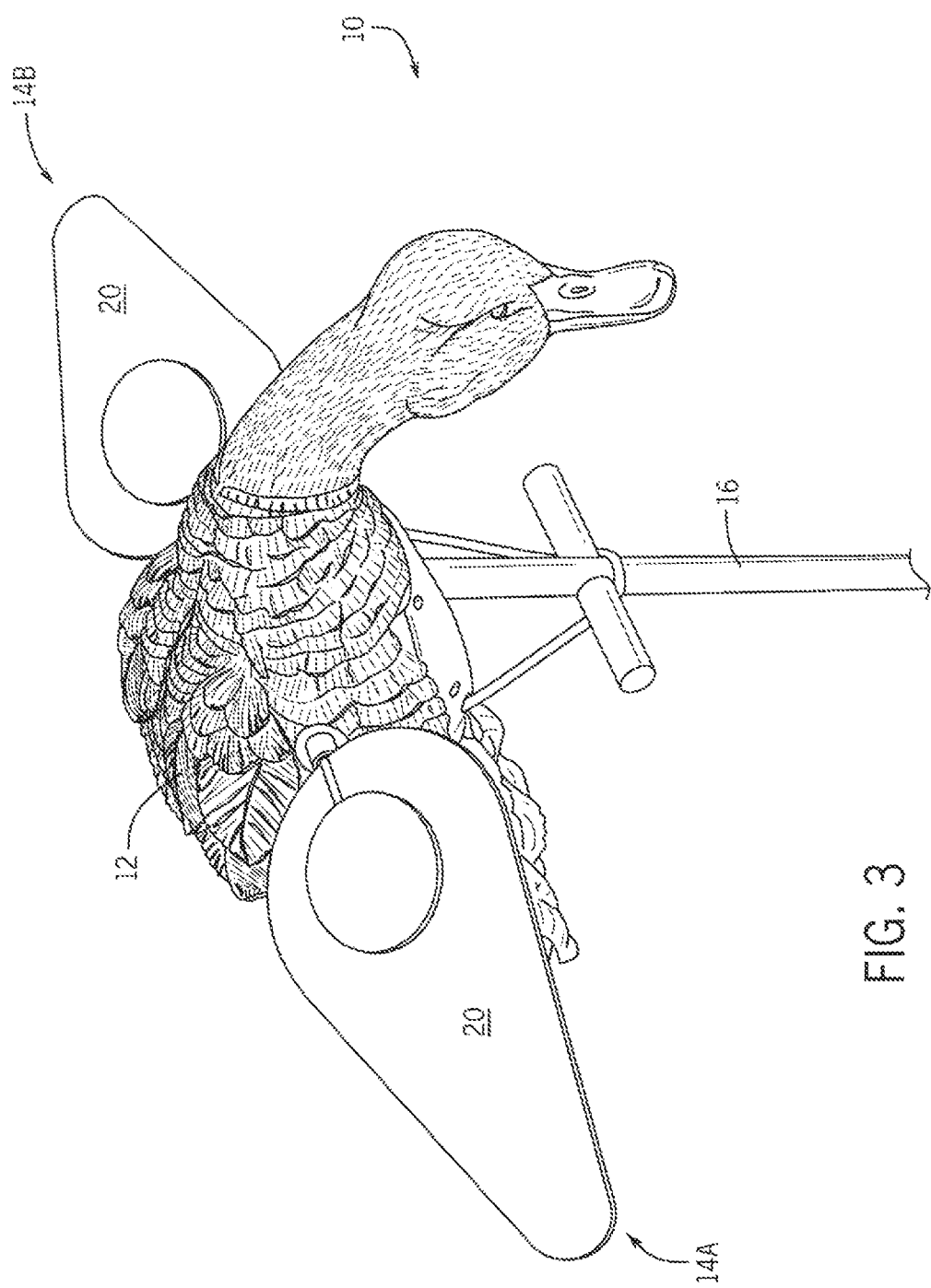
FIG. 3 is a substantially identical view of the decoy as in FIG. 1, wherein the wings are rotated so that the light side of the wings are oriented upwardly.
Figure 4:
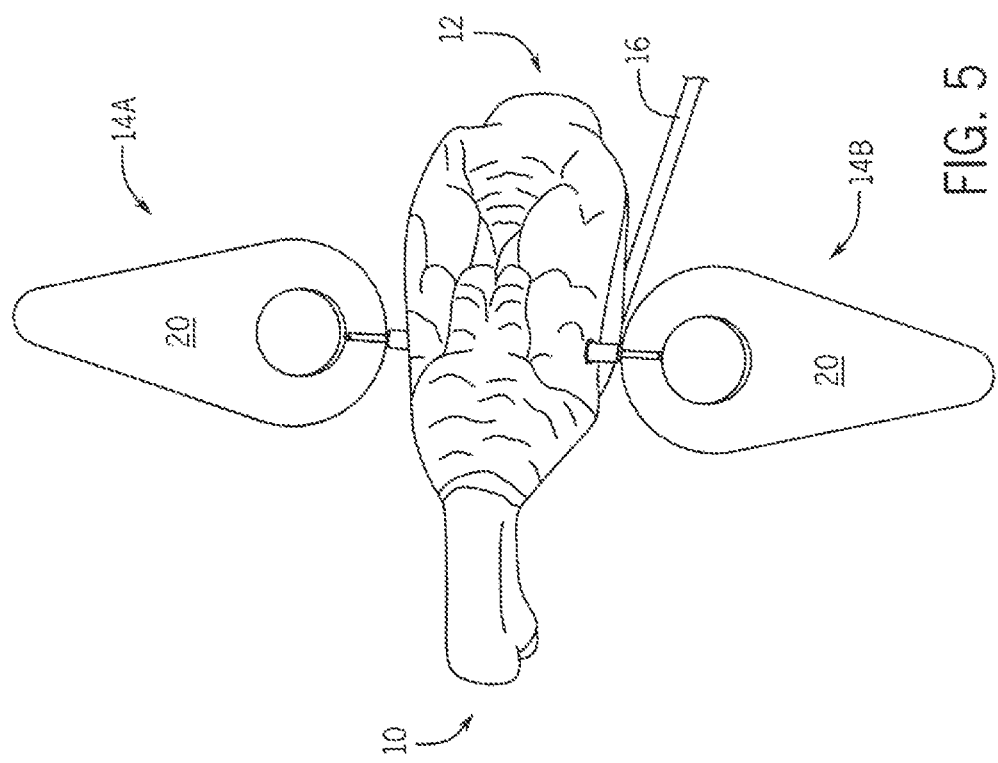
FIG. 4 is a top view of the decoy wherein the wings are stopped with the dark, feather side of the wings oriented upwardly.
Figure 5:
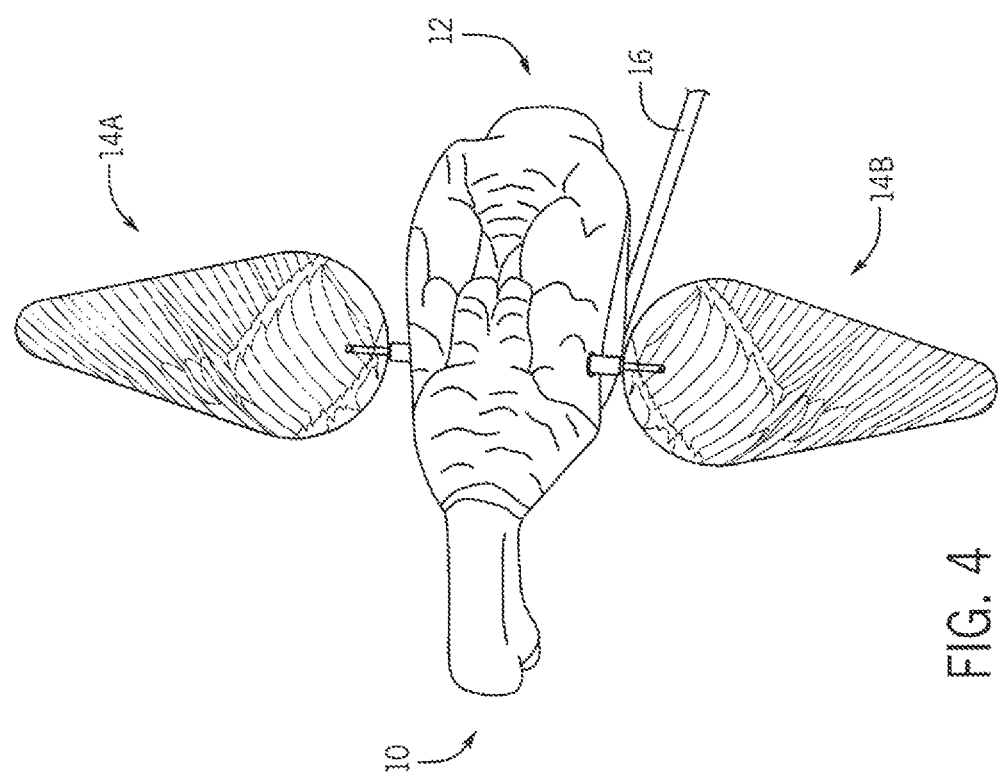
FIG. 5 is a top view of the decoy wherein the wings are stopped with the light, featherless side of the wings oriented upwardly.

Referring initially to FIGS. 1 to 3, the present invention provides an improved spinning wing migratory bird decoy 10 and a wing control system therefor. When the wings 14 rotate on a spinning migratory bird wing decoy (also known as "spinners), a visible "flash" is given off because one side 18 of the wing is dark (feather print) (See also FIGS. 4 and 6) and one side 20 of the wing is light, preferably white (See also FIGS. 5 and 7). Commonly, hunters use a remote control (not shown) to turn off the spinners because geese and sometimes ducks will not land when the wings are spinning. A major problem that occurs is that sometimes the white side 20 of the wing stops facing up as shown in FIGS. 3 and 5. The white side 20 facing up doesn't look natural, and this tends to scare birds away. Where the wing 14 stops in the prior art is completely random.

Attempts have been made to try to weight one side of the wings to stop them a certain way, by they have failed. Weighting creates significant vibration, wobble, and noise. Further, weighting ruins the bearings of the motor quickly. Insofar as is known, no one has come up with a way to control how the wing stops on a spinner.

In the present invention, when power is turned off by a remote controller, a photo eye sensor system 38 identifies when a motor shaft needs to stop spinning so that the dark side of a wing stops facing upward. When the motor shaft is in a correct location, a 3 part wing shaft control cylinder 42 A/B/C is engaged, which locks the motor shaft/wing in the correct position with the dark side 18 (feather) up. When engaged, a pin 44 from the cylinder assembly 42 goes into a wing shaft gear 50, which stops and holds the wing shaft 40, and therefore the wings 14, in the correct position as shown in FIGS. 1 and 4.

The wing stopping system and method, and the motor module 30 of the present invention may optimally be implemented in a spinning wing migratory bird decoy such as that shown and described in U.S. Pat. No. 10,638,747 and/or the LUCKY HD Decoy manufacture and sold by applicants' assignee, Lucky Duck Decoys of Baldwin, Wisconsin USA, all of which are hereby incorporated by reference herein.

FIG. 1 is perspective view, from the top front, of an embodiment of a spinning wing migratory bird decoy 10. The decoy 10 has a body 12 from which wings 14 A and B extend. The wings 14 are coupled to the body 12 preferably by connectors 22. The decoy 10 is mountable on a stand 16. One side 18 of the wings 14 have a dark surface look or color, typically including a feather pattern that mimics the top or outer side of waterfowl or other migratory bird wings. The opposite side 20 of the wings 14 have a light look or color, typically white and devoid of a feather pattern. The difference in look mimics a live bird.

FIG. 1 is perspective view, from the top front, of a spinning wing migratory bird decoy 10 showing the side 18 of the wings with a dark surface look or color, typically including a feather pattern that mimics the top or outer side of waterfowl or other migratory bird wings. FIG. 2 is a perspective view, from the bottom front, of the decoy 10 and showing the opposite side 20 of the wings with a light look or color, typically white and devoid of a feather pattern. FIG. 3 is a substantially identical view of the decoy 10 as in FIG. 1, wherein the wings 14 are rotated so that the light side 20 of the wings 18 are oriented upwardly. FIG. 4 is a top view of the decoy 10 wherein the wings 14 are stopped with the dark, feather side 18 of the wings 14 oriented upwardly. FIG. 5 is a top view of the decoy 10 wherein the wings 14 are stopped with the light, featherless side 20 of the wings oriented upwardly. FIGS. 1 and 4 show the desirable position to attract waterfowl and FIGS. 3 and 5 are the position that is not desirable.

Figure 6:
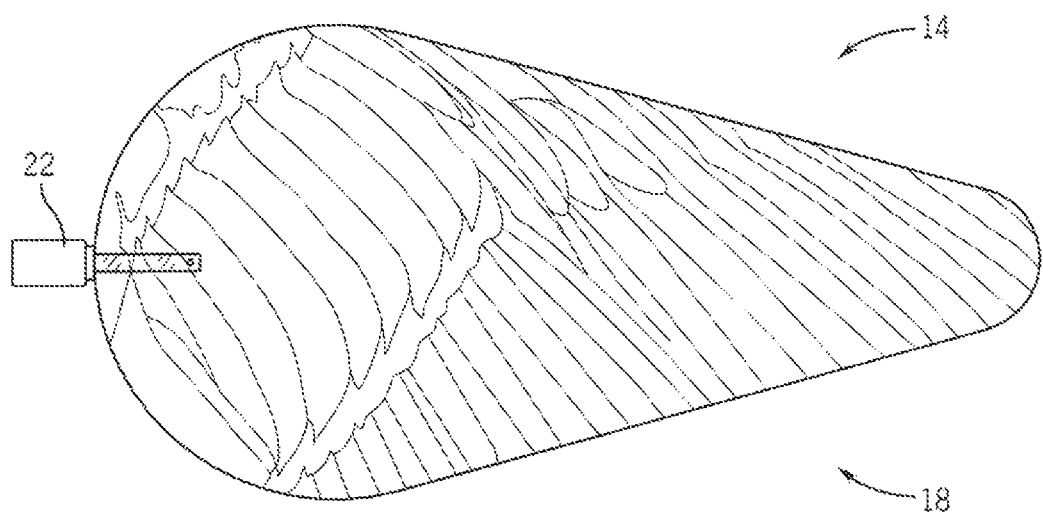
FIG. 6 is a detailed top view of the dark, feather side of a wing.
Figure 7:
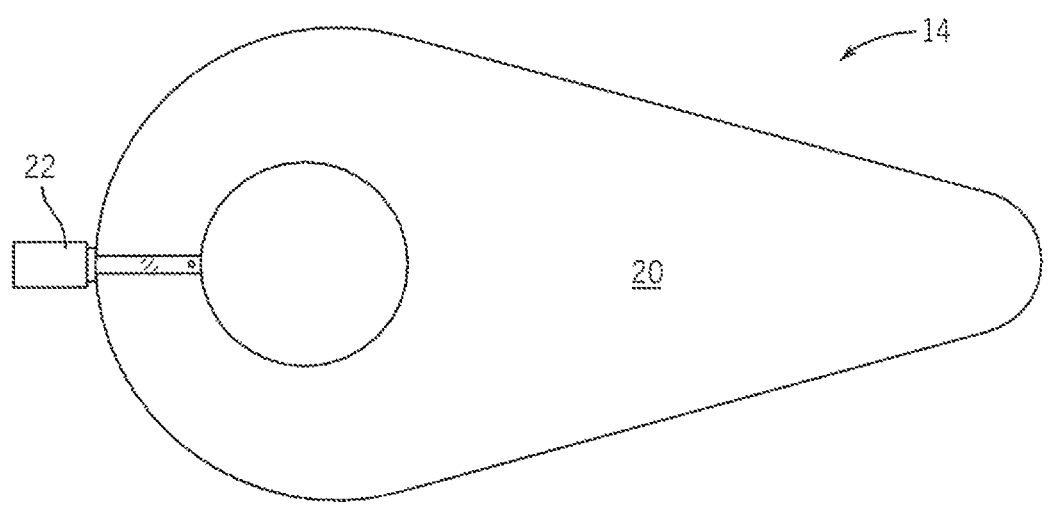
FIG. 7 is a detailed top view of the light, featherless side of the wing.
Figure 8:
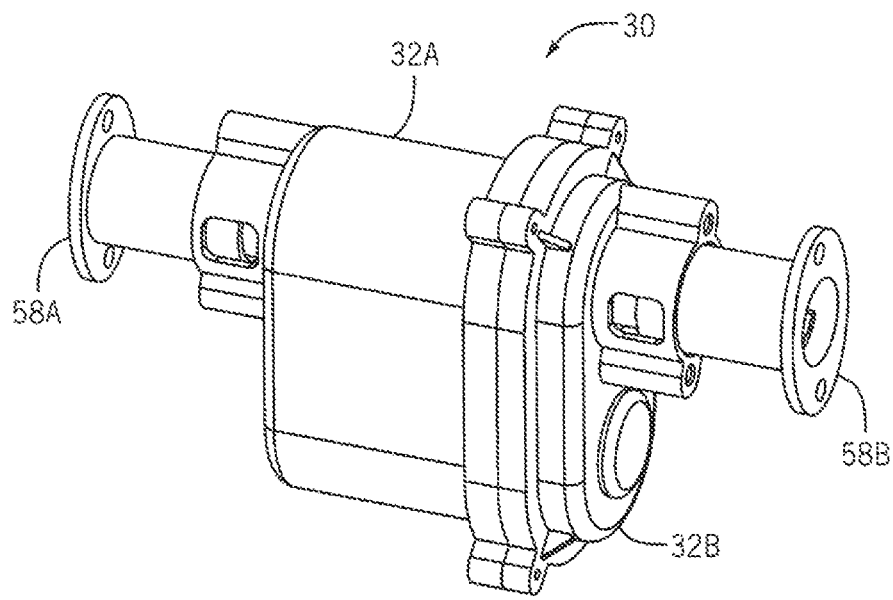
FIG. 8 is a perspective, or isometric, view of an embodiment of a motor module for controlling the feather side up stoppage of spinning wings, of the present invention.
Figure 9:
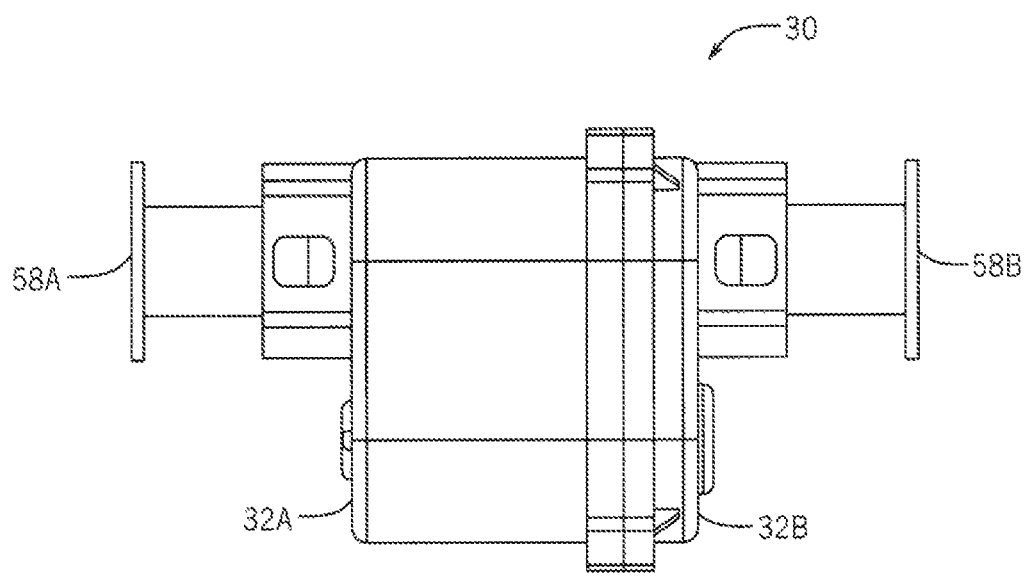
FIG. 9 is a side elevation view of the motor module.
Figure 10:
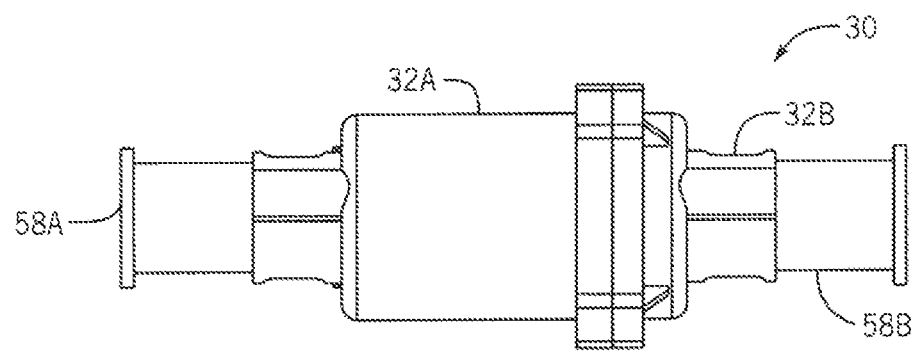
FIG. 10 is a top view of the motor module.
Figure 11:
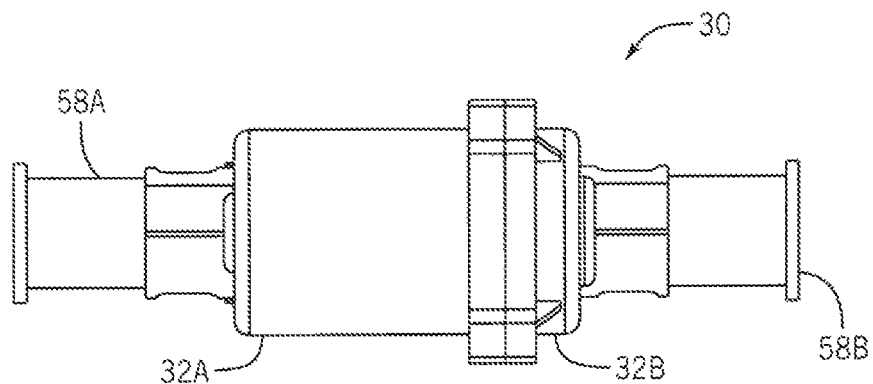
FIG. 11 is a bottom view of the motor module.

FIG. 6 is a detailed top view of the dark, feather side 18 of a wing. FIG. 7 is a detailed top view of the light, featherless side 20 of the wing.

Figures 12, 13:
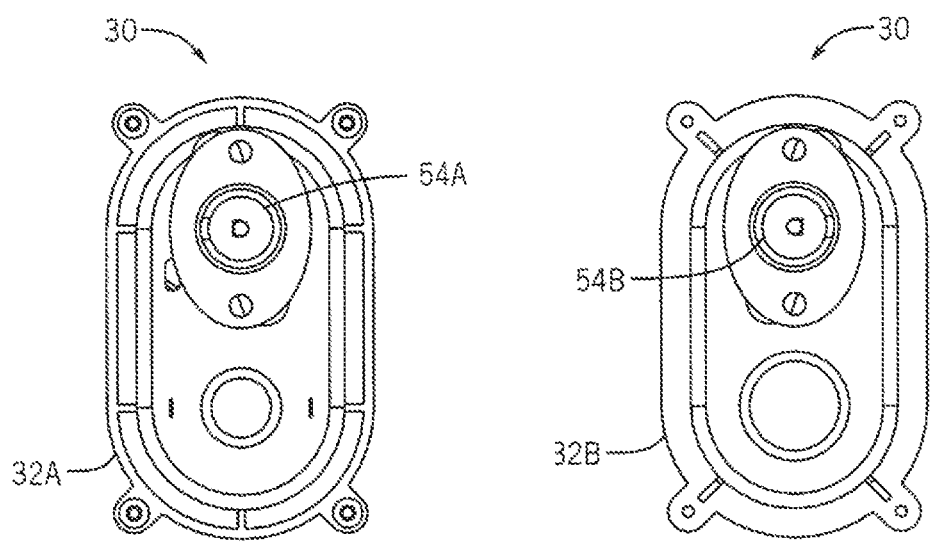
FIG. 12 is a right or first end view of the motor module.
FIG. 13 is a left or second end view of the motor module.

FIGS. 8 to 13 show an embodiment of a motor module 30 for controlling the feather side up stoppage of spinning wings 14, of the decoy 10 of present invention. Viewable from the exterior of the motor module 30 are a housing 32, preferably having two parts, left and right, A and B, and exterior motor module mounts 58 A and B, extending from the housing 32. End views FIGS. 12 and 13 show wing adaptors 54 A and B extending through the module mounts 58 for coupling with connectors 22 on shafts extending to panels of each wing 14 A/B.

Figure 14:
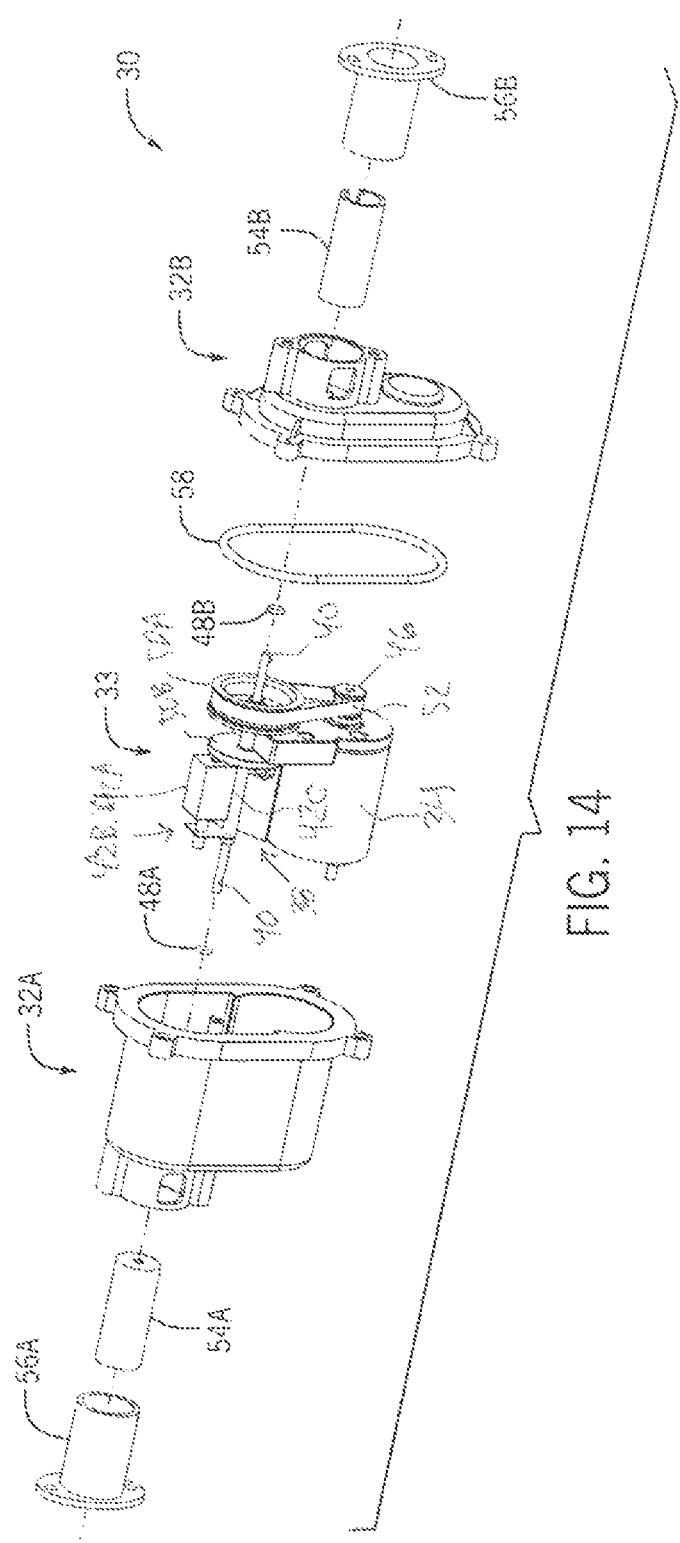
FIG. 14 is a partially exploded view of the motor module.
Figure 15:
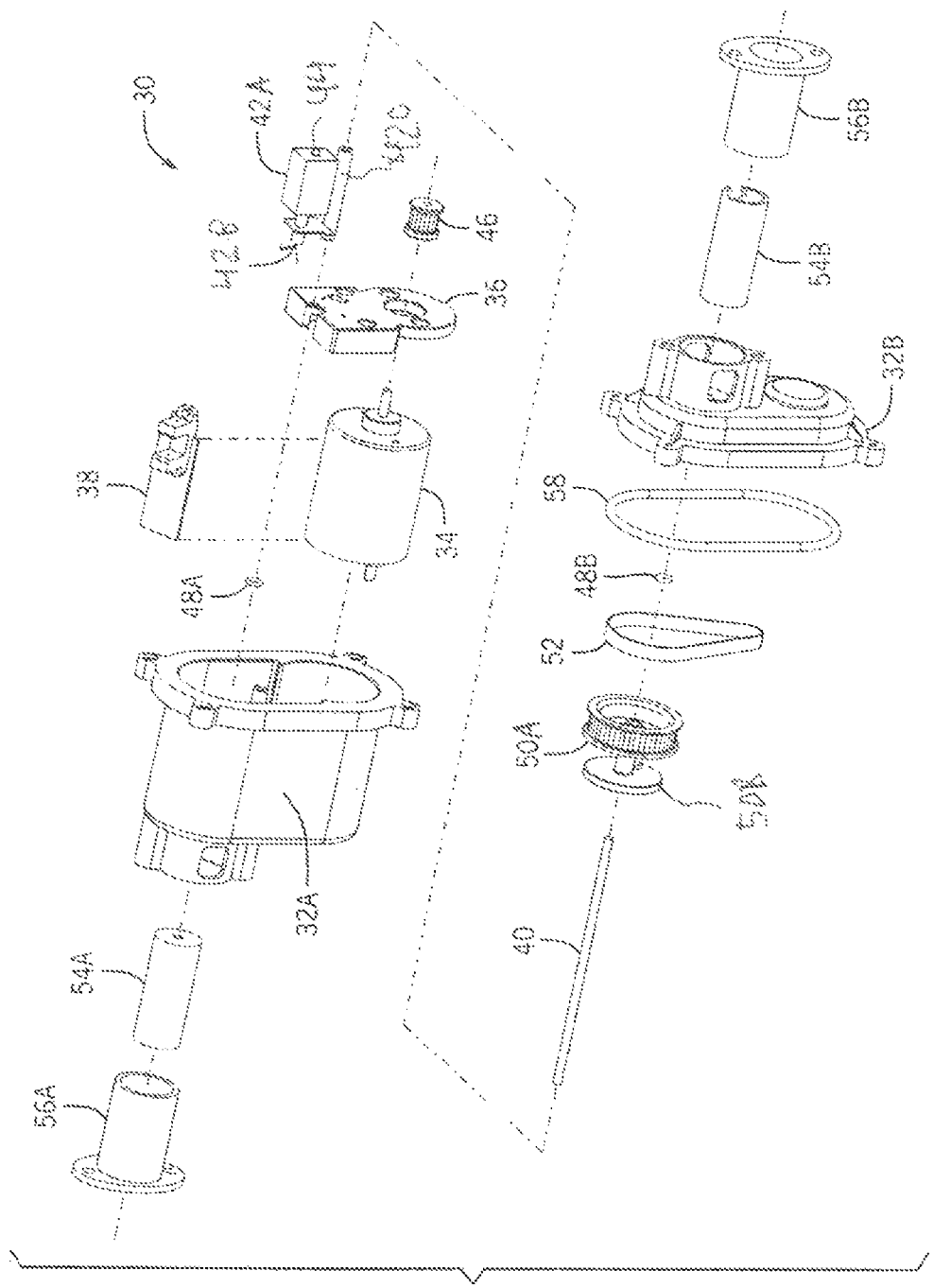
FIG. 15 is a fully exploded view of the motor module.

FIGS. 14 and 15 are a partially and fully exploded view of the motor module 30. In addition to the external features discussed above, the motor module 30 embodiment comprises an electric motor 34 coupled to a motor mount 36 which is fixed to the housing 32. A motor housing O-ring 58 is preferably disposed between the housing 32 halves A and B. A wing shaft control cylinder 44 is connected to a top area of the mount 36 and to the shaft 40. The wing shaft gear 50 comprises a two part wing shaft gear 50 A/B. The wing adaptors 54 are connected to the opposing ends of the shaft 40. The shaft 40 is driven by a belt drive arrangement whereby a motor gear 46 is connected to the motor 34, and a motor 46 gear is communicatively connected to the wing shaft gear 50A/B via a wing shaft belt 52. So the motor 34 drives the shaft 40 which drives the adaptors 54, which rotates the wings 14. Sealing O-rings 48 are connected to the ends of the shaft 40.

Figure 16:
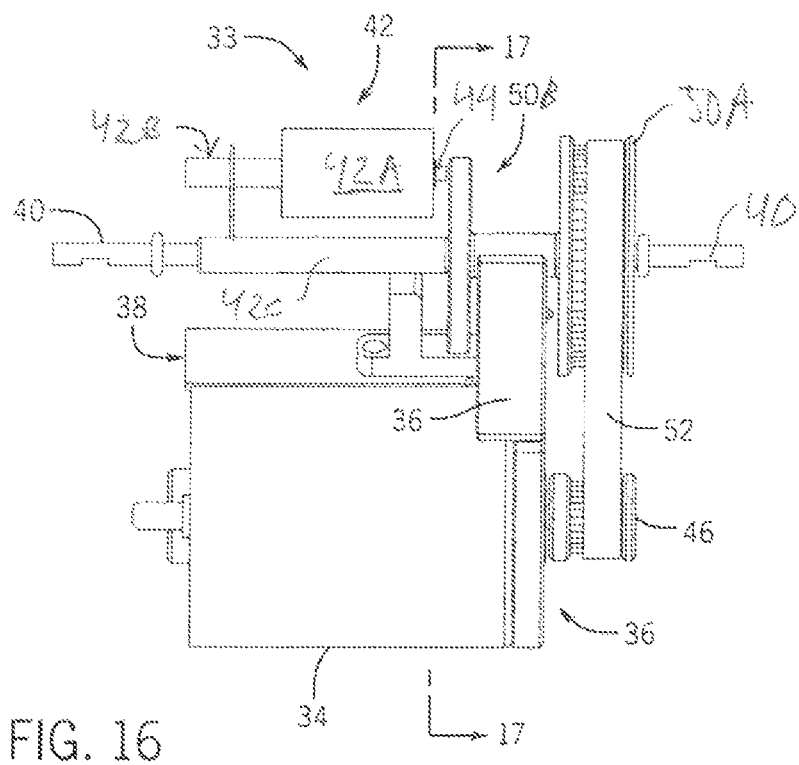
FIG. 16 is a side elevation view of an embodiment of the internal features (including the motor, photo eye sensor, and wing shaft control cylinder) of the motor module.
Figure 17:
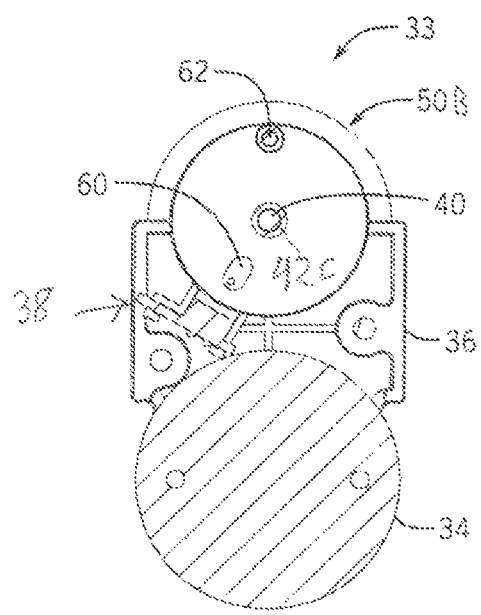
FIG. 17 is a cross sectional view of the internal features taken along line 17-17 of FIG. 16.

FIG. 16 is a side elevation view of an embodiment of the internal features of the motor module 30, including the motor 34, the wing shaft control cylinder 42, and a photo eye sensor 38. FIG. 17 is a cross sectional view of the internal features taken along line 17-17 of FIG. 16. Hole 62 is disposed in one part 50B of the two part wing shaft gear 50A/B. The photo eye sensor 38 stops the wings 14 from spinning, and control cylinder 42 locks the wing shaft 40 from rotating. A slot 60 is disposed in the wing shaft gear 50. The photo eye sensor 38 locates the slot 60 and stops the wing shaft 40 with wings 14 in the feather up position 18.

Figure 18:
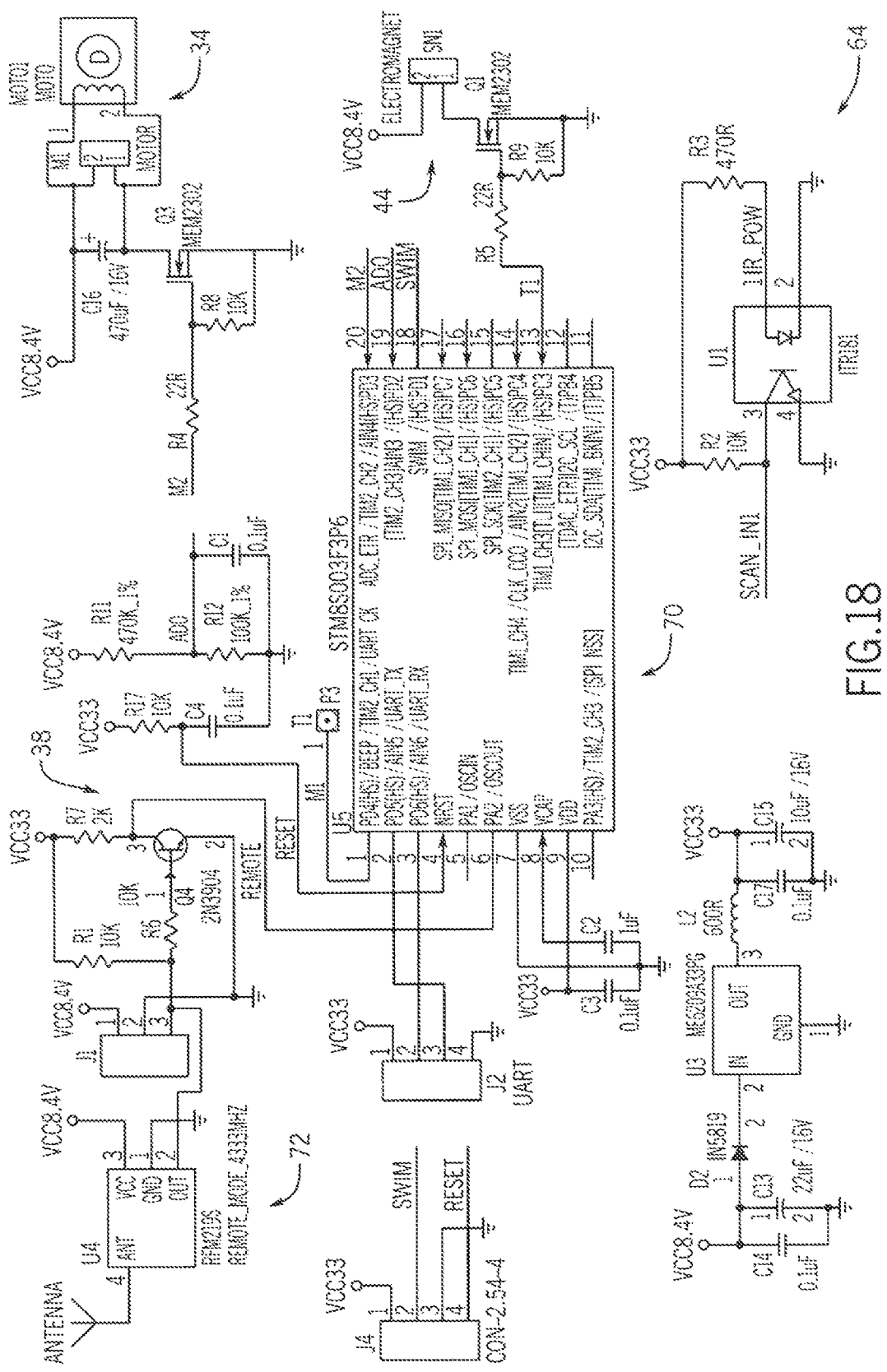
FIG. 18 is a schematic diagram of an embodiment of the power and control circuit of the system.

FIG. 18 is a schematic diagram of an embodiment of the power and control circuitry 64 of the system including a micro controller 70 and a receiver 72 for communicating with a remote controller.

In use, when power is turned off by a remote controller, the photo eye sensor 38 identifies when the motor 34 and shaft 40 need to stop spinning so that the dark side 18 of a wing 14 stops facing upward. When the shaft 40 is in a correct location, the wing shaft control cylinder 42 is engaged. The pin 44 from the cylinder 42A goes into the aligned hole 62 in one part 50B of the two part wing shaft gear 50A/B, which stops and holds the wing shaft 40, and therefore the wing 14, in the correct position with the dark side (feather) 18 up.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:
1. The decoy comprising:
   a decoy body constructed of a predetermined material, the decoy body being arranged in a predetermined orientation to simulate a bird, the decoy body having a top and a bottom, at least one decoy wing connected to the decoy body, the at least one decoy wing being constructed and arranged to simulate a wing of the bird, the at least one decoy wing having a top surface having a first predetermined pattern or color and a bottom surface having a second predetermined pattern or color which is different than the first predetermined pattern or color, a drive assembly including a motor coupled to the at least one decoy wing to cause the at least one decoy wing to spin when actuated, and means to stop the at least one decoy wing in a predetermined position, whereby the top surface of the at least one decoy wing is disposed upwardly relative to a ground or water surface;

wherein:
  a) the decoy is constructed and arranged to simulate an appearance of the bird, the bird being a waterfowl or migratory bird;
  b) the at least one decoy wing comprising two decoy wings, each of the two decoy wings comprising a shaft having a first end for mating with the drive assembly and a second end connected to a wing panel, the wing panel being flat and planar;
  c) the drive assembly includes a mounting bracket connected to an interior cavity of the decoy body for holding the motor in place, and a belt drive mechanism including a belt coupled to a first gear which is connected to a drive shaft of the motor, the belt further being coupled to a second gear, the second gear being communicatively coupled to the first end of each of the shafts;
  d) the means to stop comprises a wing shaft control cylinder, the wing shaft control cylinder comprising a stop pin; and
  e) wherein the means to stop further comprises an optical sensor communicatively connected to the wing shaft control cylinder, the optical sensor detecting when the top surfaces of the decoy wings are disposed upwardly and actuating the control cylinder to extend the stop pin into the second gear to thereby stop the top surfaces of the decoy wings in the predetermined positions.

2. The decoy of claim 1, wherein the drive assembly spins the decoy wings.

3. The decoy of claim 1, wherein the first predetermined pattern or color is dark and simulates a top surface of the waterfowl or migratory bird and the second predetermined pattern or color is light relative to the dark first predetermined pattern or color and simulates a bottom surface of the waterfowl or migratory bird.

* * * * *